Nov. 12, 1968     A. J. MORROW     3,409,971

WIRING HARNESS AID

Filed June 8, 1965

ANTHONY J. MORROW
INVENTOR.

KENDRICK, SUBKOW and STOLZY
BY

John P. Powell
ATTORNEYS 3,409,971
WIRING HARNESS AID
Anthony J. Morrow, Los Angeles, Calif., assignor of one-half to Arthur De Spirito, Los Angeles, Calif.
Filed June 8, 1965, Ser. No. 462,296
9 Claims. (Cl. 29—203)

This invention relates to the electrical wiring art and more particularly to a wiring harness aid.

Although the present invention has been found to possess exceptional utility in the construction and maintenance of electrical harnesses and the like, it will have a large scope of application and it is not limited to the specific uses suggested herein.

The assembly of wiring into a harness for use in telephone switch boards, on ships and aircraft, and in computers and other electrical equipment has in the past been a tedious and time-consuming operation. The repair of electrical harnesses has, likewise, been difficult and costly.

A conventional method in the past to assemble wiring harnesses has been to lay out a wiring diagram to cover proposed circuits on a mounting board or other surface. Double headed nails are driven into the mounting board in pairs along the proposed circuits. Wires are placed between the double headed nails and tied together with thread or twine. Each time a new wire is added in the assembling of the wiring harness it is necessary to cut the old thread and retie the thread around the new wire along with the old wires. As the wiring harness grows in size it often becomes necessary to remove one or more of the double headed nails and replace them in the board to allow for expansion of the harness.

Once the entire harness has been assembled and tied the double headed nails are removed and the harness is taken from the mounting board. At this point some wiring harnesses are completely wrapped with a protective outer material.

The disadvantage of the above-described method is the need for cutting and tieing of the thread which binds the wires in the harness each time a new wire is added, and the necessity of adjusting the double headed nails to compensate for the enlargement of the harness as it is assembled.

In accordance with the present invention the above-described and other disadvantages of the prior art are overcome by assembling a wiring harness in clamp means. Note will be taken that in this method it is unnecessary to use thread to hold the wires in place in the harness or adjust the double headed nails to receive the wiring harness because the clamp means hold the wires firmly in position and can compensate for the growth of the harness. Further, tieing and retieing the harness is made unnecessary.

According to an outstanding feature of the present invention a harness aid is provided with a resilient ring having an opening therein and elastomeric body which is located inside the ring and has a groove on its outer edge to mate with the resilient ring. The ring being constructed of stiffer material than the elastomeric body causes the body to deform as wires are inserted into the ring.

In certain configurations a ring may be constructed of spring steel and the elastomeric body of rubber in the form of a grommet. In other configurations, the ring may be split so that it may be enlarged to accommodate an even greater number of wires than could normally be held by deformation of the elastomeric body. The ring may be provided with a perpendicular leg which extends outwardly from the ring and has a foot portion for attaching the ring to a mounting surface. The foot portion may have a hole therein to accommodate the fastening of the ring to the mounting surface by means of a screw.

A principal cause of short circuits in wiring harnesses in the past has been the rubbing together of wires within the harness when it is attached to a mounting surface, either at the point of attachment or along the points of contact between the wires. Vibrational movement of the wiring harness may be imparted by reason of the nature of the mounting surface such as in aircraft or by reason of seismic or other disturbances. If the wiring harness is not allowed to shift slightly as the mounting surface moves, friction will be caused at various points within the harness and an electrical short may result. In such a situation in the conventional electrical harness it is necessary to cut the thread binding the harness so that the wires will be exposed and may be either repaired or removed.

According to the present invention the harness aid may be adapted for permanent use on an electrical harness as it is affixed in the particular electrical equipment. In such a situation the harness aid holds the wires firmly in a generally exposed position. The inner elastomeric ring allows for slight movement of the wires within the harness and absorbs various shock loads, thereby decreasing the possibility of wear among the wires and an electrical short. The harness aid of the present invention is constructed in such a manner that should an electrical wire within the harness need to be removed or exposed for repair, the particular wire is easily pulled through the opening in the harness aid to an exposed position.

The above-described and other objects and advantages of the present invention will be better understood when considered with the following description taken in connection with the accompanying drawings which are made a part of this specification wherein several embodiments are illustrated by way of example.

In the drawings, which are to be regarded as merely illustrative:

Figure 1:
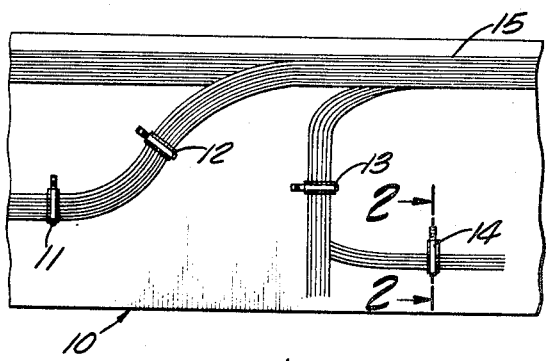
FIG. 1 is a side elevational view of a harness board with harness aids attached thereto, wires are shown inserted in the harness aids.

In FIG. 1 a mounting board is indicated at 10. Harness aids are attached to the mounting board and are indicated at 11, 12, 13 and 14. A group of wires are indicated at 15, which wires are held in place by harness aids 11, 12, 13 and 14.

Figure 2:
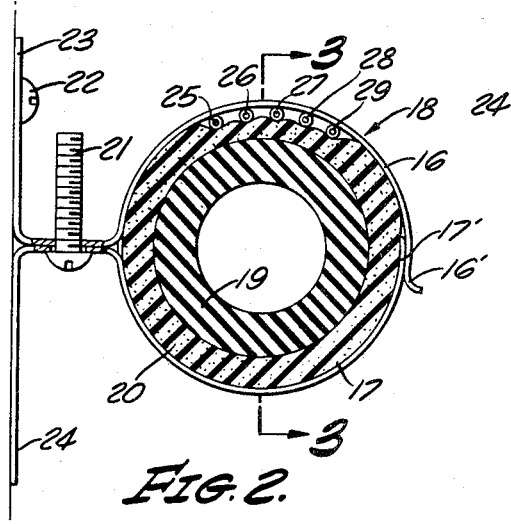
FIG. 2 is a transverse sectional view of a portion of the harness aid taken along line 2—2 in FIG. 1.

FIG. 2 is a sectional view of harness aid 14 across the midsection thereof. A portion of the resilient ring member is shown at 16 and the mating portion of the resilient ring member is shown at 17. The resilient deformable insert member or grommet is shown at 18 with inner and outer rubber portions shown at 19 and 20. Rubber portion 20 is softer than that of rubber portion 19. A metal screw is shown at 21 which binds members 16 and 17 together to form a complete resilient ring. An opening is formed in the ring member by the overlapping elements 16' and 17'. On the overlapping end of 16' is a lip which facilitates insertion of wires into the harness aid. A mounting screw is shown at 22 by which the harness aid may be affixed to mounting board 10. Foot portions of resilient members 16 and 17 which enable the harness aid to be affixed to the mounting board 10 are shown at 23 and 24, respectively.

Figure 3:
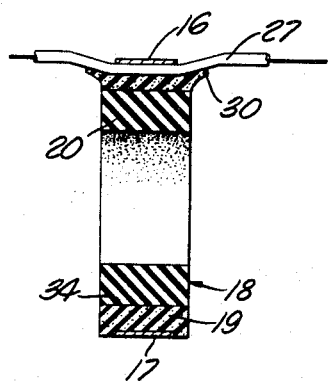
FIG. 3 is a sectional view of a harness aid taken on line 3—3 shown in FIG. 2.

A portion of wires 15 have been shown at 25, 26, 27, 28 and 29 as they are positioned in the harness aid. In FIG. 3 wire 28 is shown and its deformation of the flange portion of the deformable insert member 18 is shown at 30. On the outside edge of the resilient deformable member 18 is a channel 34 to mate with resilient members 16 and 17.

Figure 4:
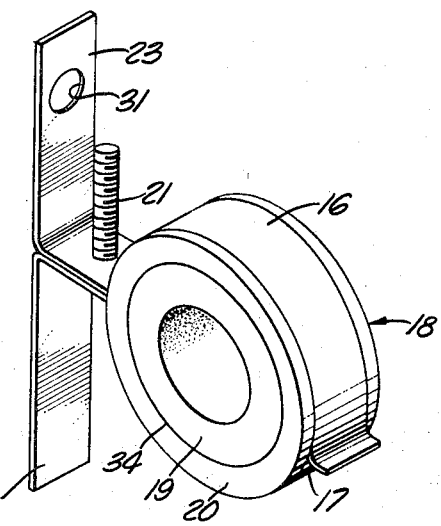
FIG. 4 is a perspective view of a harness aid constructed in accordance with the present invention.

In FIG. 4 a hole through foot member 23 is shown at 31 by which the harness aid may be affixed to the mounting surface.

Figure 5:
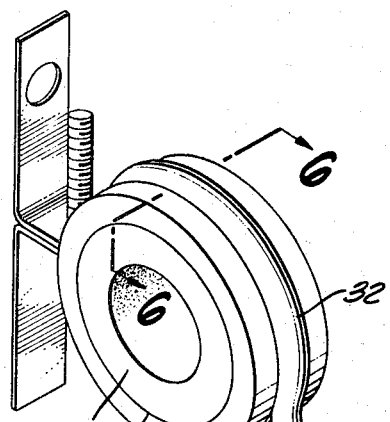
FIG. 5 is a perspective view of an alternative embodiment of the present invention.
Figure 6:
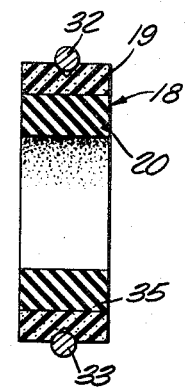
FIG. 6 is a transverse sectional view taken on line 6—6 shown in FIG. 5.

In FIGS. 5 and 6 alternative resilient ring members with circular cross-sections are shown at 32 and 33. A lip is shown on the end of element 32 in the alternative embodiment shown in FIG. 5 which facilitates insertion of the wires in the harness aid. Ring members 32 and 33, as shown in FIG. 5, mate with a groove 35 which is formed in the resilient deformable member.

From the foregoing figures an advantage of the present invention can easily be seen in that wires may be inserted into the harness aid under the lip of member 16′ and lodged between the said member 16 and the deformable insert member 20. The deformable insert member holds the wires firmly in position by pressing them against the ring member. It can also be seen that the wires are easily inserted into the harness aid or removed therefrom by springing member 16 from its position in which it overlaps member 17, as shown in FIG. 2. It can be appreciated that from the view shown in FIG. 2 that any one of the particular wires 25, 26, 27, 28 or 29 may be removed from the harness aid without disturbing the relative position of the other wires by slightly deforming member 20 and slipping the particular wire out of the hole formed by the overlapping portion of members 16 and 17.

An additional object of the present invention, the accommodation of a large number of wires, is achieved by screw 21 which attaches spring members 16 and 17 together. When a large number of wires has been inserted into the harness aid and deformable member 18 has been displaced to accommodate the maximum number of wires, screw 21 may be loosened to enlarge the area encompassed by ring members 16 and 17, thereby enabling it to accommodate a larger number of wires. It may also be seen from FIG. 2 that another object of the present invention, namely, the removal of the harness aid, may be easily accomplished by removing the screw 21 and dismantling arcuate portions 16 and 17 and the deformable insert member 20.

Although only two embodiments of the present invention have been described and illustrated herein, many changes and modifications will, of course, suggest themselves to those skilled in the art. These embodiments have been selected for this disclosure only for the purpose of illustration. The present invention should, therefore, not be limited to the embodiments so selected, the true scope of the invention only being defined in the appended claims.

What is claimed is:
1. A wiring harness aid, comprising:
first and second open-sided, arcuate spring members; means securing the spring members together with the open sides facing each other, the relative dimensions of said spring members being such that an end of one of said members overlaps an end of the other member; and
resilient means clampingly received between said spring members whereby wires can be forced between the overlapping ends of said spring members for being secured between the resilient means and associated spring member.

2. A wiring harness aid as in claim 1, in which the resilient means includes a rubber grommet.

3. A wiring harness aid as in claim 2, in which the grommet includes an inner tubular member and an outer tubular member surrounding said inner tubular member, said inner tubular member being composed of a less resilient material than said outer tubular member.

4. A wiring harness aid as in claim 1, in which said spring members include extending portions and said securing means includes a threaded member engaging said extending portions.

5. A wiring harness aid, comprising:
an insulative tubular member for being received about a multiwire cable;
resilient clamping means surroundingly engaging the insulative tubular member and included cable, said clamping means including a pair of elongated metallic springlike arms formed to provide an opening within which to receive the tubular member, the end margins of said arms overlapping one another.

6. A wiring harness aid as in claim 5, in which the outermost arm end margin has its end deformed to extend outwardly away from the end margin of the other arm whereby a wire to be added can be readily slipped between the end margins of the arms for being secured by the arms against the insulative tubular member.

7. A wiring harness aid as in claim 5, in which the insulative tubular member has its outer surface portions appropriately grooved to receive the clamping means.

8. A wiring harness aid as in claim 5, in which the insulative tubular member is constructed of an elastomeric material.

9. A wiring harness aid as in claim 5, in which the insulative tubular member includes a first part immediately adjacent the cable, and a second part of a material softer and more resilient lying over the first part.

References Cited
UNITED STATES PATENTS

| | | | |
|---|---|---|---|
| 2,264,408 | 12/1941 | Rohr et al. | 29—464 |
| 2,396,837 | 3/1946 | Ellinwood | 174—40 |
| 2,805,471 | 9/1957 | Lowden | 29—407 X |
| 3,054,586 | 9/1962 | Kirkup | 248—14 |
| 3,258,039 | 6/1966 | Ewalt. | |

THOMAS H. EAGER, *Primary Examiner.*